US012747669B2

(12) United States Patent
Liu et al.

(10) Patent No.: US 12,747,669 B2
(45) Date of Patent: Sep. 29, 2026

(54) SYSTEMS AND METHODS FOR FORMING PROTECTIVE COATINGS

(71) Applicant: MEGA P&C Advanced Materials (Shanghai) Co., Ltd., Shanghai (CN)

(72) Inventors: Vida Liu, Shanghai (CN); Bosco Liu, Shanghai (CN)

(73) Assignee: MEGA P&C Advanced Materials (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/708,236

(22) PCT Filed: Nov. 8, 2021

(86) PCT No.: PCT/CN2021/129327
§ 371 (c)(1),
(2) Date: May 8, 2024

(87) PCT Pub. No.: WO2023/077514
PCT Pub. Date: May 11, 2023

(65) Prior Publication Data
US 2024/0426220 A1 Dec. 26, 2024

(51) Int. Cl.

| | |
|---|---|
| ***C09D 175/04*** | (2006.01) |
| ***C09D 9/00*** | (2006.01) |
| ***C09D 175/02*** | (2006.01) |
| ***F01D 5/28*** | (2006.01) |
| ***F03D 1/06*** | (2006.01) |

(52) U.S. Cl.
CPC ............. *F01D 5/288* (2013.01); *C09D 9/005* (2013.01); *C09D 175/02* (2013.01); *C09D 175/04* (2013.01); *F03D 1/0675* (2013.01); *F05B 2280/6011* (2013.01)

(58) Field of Classification Search
CPC ....... F01D 5/288; C09D 9/005; C09D 175/02; C09D 175/04; F03D 1/0675; F03D 1/0688; F05B 2280/6011; F05B 2230/90; B29L 2031/085; B05D 3/105; B05D 7/544; B05D 2503/00; Y02E 10/72
See application file for complete search history.

(56) References Cited

U.S. PATENT DOCUMENTS 4,459,317 A * 7/1984 Lambert .................. C08J 7/043 428/420
5,688,573 A * 11/1997 Goeb ................. C08G 18/4063 428/40.1

(Continued)

FOREIGN PATENT DOCUMENTS

CN 101103085 1/2008
CN 101695689 4/2010

(Continued)

OTHER PUBLICATIONS

"How To Apply Polyurethane Sealer" (Vila) ; https://web.archive.org/web/20210201000000*/https://diy.stackexchange.com/questions/20753/what-is-the-proper-procedure-to-apply-multiple-coats-of-polyurethane (Year: 2014).*

(Continued)

*Primary Examiner* — Gordon Baldwin
*Assistant Examiner* — Christina D McClure

(57) ABSTRACT

Embodiments relate to a method for forming a protective coating on a substrate and a wind power generation system which comprises a blade and a protective coating on the blade.

26 Claims, 7 Drawing Sheets

(56) References Cited

U.S. PATENT DOCUMENTS

| | | | | |
|---|---|---|---|---|
| 2006/0256176 | A1* | 11/2006 | Prasad | C09D 11/38 106/31.86 |
| 2007/0218295 | A1 | 9/2007 | Bateman | |
| 2012/0201963 | A1* | 8/2012 | Li | B05D 1/28 524/871 |

FOREIGN PATENT DOCUMENTS

| | | |
|---|---|---|
| CN | 101978005 | 2/2011 |
| CN | 105457860 | 4/2016 |
| CN | 108167334 | 6/2018 |
| CN | 210560202 | 5/2020 |
| WO | WO 2023/077514 | 5/2023 |

OTHER PUBLICATIONS

"What is the proper procedure to apply multiple coats of Polyurethane" (stackexchange) ; https://diy.stackexchange.com/questions/20753/what-is-the-proper-procedure-to-apply-multiple-coats-of-polyurethane (Year: 2016).*

* cited by examiner

| Examples | Figures |
|---|---|
| 3-1 |  |
| 3-2 |  |
| 3-3 |  |
| 3-4 |  |
| 3-5 |  |
| 3-6 |  |
| 3-7 |  |
| 3-8 |  |
| 3-9 |  |
| 3-10 |  |

| | |
|---|---|
| 3-11 |  |
| 3-12 |  |
| 3-13 |  |
| 3-14 |  |
| 3-15 |  |
| 3-16 |  |
| 3-17 |   |
| 3-18 |  |
| 3-19 |  |
| 3-20 |  |

| | |
|---|---|
| 3-21 | 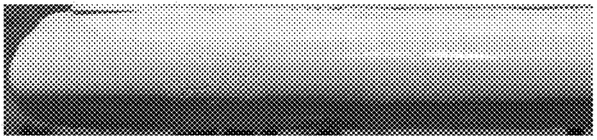 |
| 3-22 | 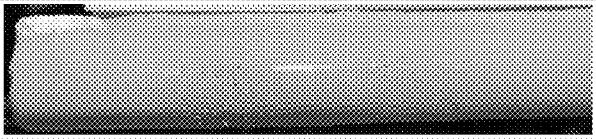 |
| 3-23 | 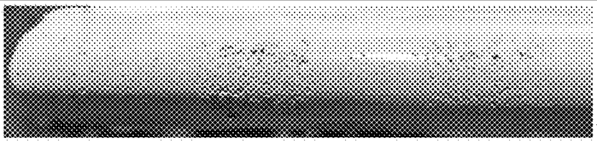 |
| 3-24 | 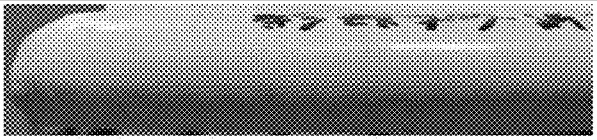 |
| 3-25 | 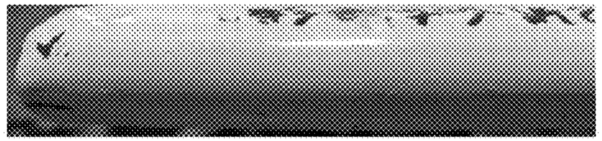 |
| 3-26 | 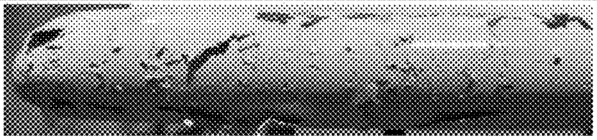 |
| 3-27 | 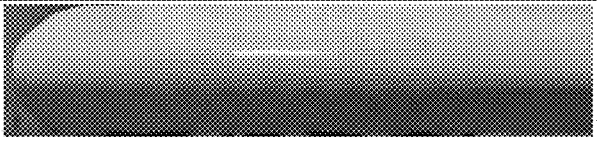 |
| 3-28 | 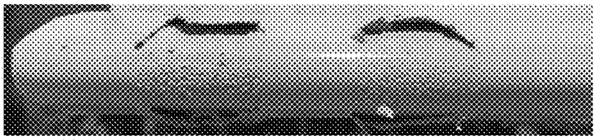 |
| 3-29 | 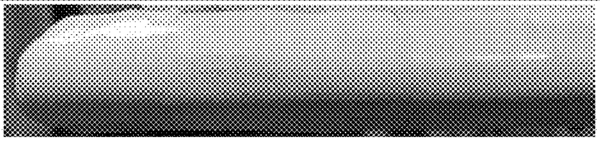 |
| 3-30 | 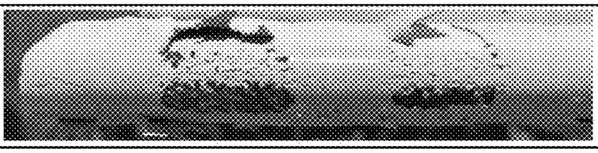 |
FIG. 3iii

| | |
|---|---|
| 4-8 | <br>ethanol \| xylene \| no solvent \| butyl acetate |
| 4-9 | <br>ethanol \| xylene \| no solvent \| butyl acetate |

SYSTEMS AND METHODS FOR FORMING PROTECTIVE COATINGS

RELATED APPLICATIONS

This application is a National Phase of PCT Patent Application No. PCT/CN2021/129327 having International filing date of Nov. 8, 2021. The contents of the above application are all incorporated by reference as if fully set forth herein in their entirety.

FIELD AND BACKGROUND OF THE INVENTION

The present disclosure relates generally to systems and methods for forming protective coatings. In particular, the present disclosure relates to systems and methods for improving the durability of polyurethane coatings for wind-based power generation systems.

SUMMARY OF THE INVENTION

A variety of different protective coatings have been used to protect leading edges of blades of power generation systems from damage. However, conventional protective coatings/layers deteriorate over time. Such deterioration includes peeling and/or stripping off of the protective coatings, particularly at the leading edge of the blades. It is recognized in the present disclosure that such deterioration of the protective coatings not only reduces protection of the blades, but also affects performance of the blades (e.g., dynamic fatigue of the blades, including reduction of the aerodynamics of the blades, resulting in reduction in power generation) and results in increased maintenance/replacement costs. Furthermore, such deteriorated protective coatings also tend to result in audible noises (e.g., whistling and/or high pitched sounds) during operation. Such noises become a nuisance to nearby residents, animals and public venues.

Several approaches are presently used to try to improve the durability of protective coatings on blades of wind generation systems. For example, land or marine protective coatings with excellent adhesion and chemical resistance to the blade substrate have been used on blades. It is recognized in the present disclosure, however, that damage and/or deterioration to protective coatings caused by wind-based power generation is significantly different (i.e., more severe) than damage and/or deterioration that can be caused to protective coatings in static applications.

For example, the current approach to verifying adhesion of protective coatings is known as the "cross-cut adhesion" test. Most acceptable protective coatings can reach the Level 0 Standard, which is the minimum industry requirement. It is recognized in the present disclosure, however, that conventional protective coatings that pass the cross-cut adhesion test will generally not pass another test known as the "rain erosion" test. In particular, upon subjecting conventional protective coatings that can pass the "cross-cut adhesion" test to the rain erosion test, the inventors have found deterioration and damage, including peeling and/or stripping, of such conventional protective coatings. Accordingly, there is a need for protective coatings that not only have excellent adhesion and chemical resistance, but also excellent rain erosion resistance.

The present disclosure proposes method/systems for improving durability and performance of blades of a wind power generation system, including improvements to interlayer adhesion and stripping resistance. The method of the present disclosure can be widely used in various types of protective coatings, in particular, protective coating for the leading edge of wind power blades.

The present disclosure relates generally to systems, subsystems, devices, methods, and processes for addressing conventional problems, including those described above and in the present disclosure, and more specifically, example embodiments relate to systems, subsystems, devices, methods, and processes for manufacturing a wind power blade, and more specifically, improving stripping resistance between multi-layered protective coating of a wind power blade.

In an exemplary embodiment, a method for forming a protective coating on a substrate is provided, the method comprising:

providing a substrate;

forming a first polyurethane coating layer on the substrate, the first polyurethane coating layer formed on the substrate in such a way that the first polyurethane coating layer reaches a touch dry state within a first time period (T1) after the first polyurethane coating layer is provided on the substrate;

applying a first evaporable solvent on the first polyurethane coating layer, wherein the first evaporable solvent is applied on the first polyurethane coating layer within a second time period (T2) after the first polyurethane coating layer reaches the touch dry state; and forming a second polyurethane coating layer on the first polyurethane coating layer, wherein:

the second polyurethane coating layer is formed on the first polyurethane coating layer within a third time period (T3) after applying the first evaporable solvent;

the first evaporable solvent applied on the first polyurethane coating layer is partially evaporated before the second polyurethane coating layer is provided on the first polyurethane coating layer; and the second polyurethane coating layer reaches the touch dry state within a fourth time period (T4) after the second polyurethane coating layer is provided on the first polyurethane coating layer.

Preferably, further comprising:

applying a second evaporable solvent on the second polyurethane coating layer, wherein the second evaporable solvent is applied on the second polyurethane coating layer within a fifth time period (T5) after the second polyurethane coating layer reaches the touch dry state; and forming a third polyurethane coating layer on the second polyurethane coating layer within a sixth time period (T6) after applying the second evaporable solvent, wherein the second evaporable solvent applied on the second polyurethane coating layer is partially evaporated before the third polyurethane coating layer is provided on the second polyurethane coating layer; and the third polyurethane coating layer reaches the touch dry state within a seventh time period (T7) after the third polyurethane coating layer is provided on the second polyurethane coating layer.

Preferably, further comprising:

applying a third evaporable solvent on the third polyurethane coating layer, wherein the third evaporable solvent is applied on the third polyurethane coating layer within an eighth time period (T8) after the third polyurethane coating layer reaches the touch dry state; and forming a fourth polyurethane coating layer on the third polyurethane coating layer within a ninth time period (T9) after applying the third evaporable solvent, wherein the third evaporable solvent applied on the third polyurethane coating layer is partially evaporated before the fourth polyurethane coating layer is provided on the third polyurethane coating layer.

Preferably, a summation of the first time period (T1) and the second time period (T2) does not exceed 60 minutes; and the third time period (T3) is between 0-300 minutes, more preferably 3-20 minutes.

Preferably, a summation of the first time period (T1) and the second time period (T2) is between 15-45 minutes.

Preferably, a summation of the fourth time period (T4) and the fifth time period (T5) does not exceed 60 minutes; and the sixth time period (T6) is between 0-300 minutes, more preferably 3-20 minutes.

Preferably, wherein a summation of the fourth time period (T4) and the fifth time period (T5) is between 15-45 minutes.

Preferably, wherein a summation of the seventh time period (T7) and the eighth time period (T8) does not exceed 60 minutes; and the ninth time period (T9) is between 0-300 minutes, more preferably 3-20 minutes.

Preferably, a summation of the seventh time period (T7) and the eighth time period (T8) is between 15-45 minutes.

Preferably, wherein at least one of the following apply: T2≈(0.3–10)*T1; T5≈(0.3–10)*T4; and T8≈(0.3–10)*T7.

Preferably, at least one of the following apply:

the first evaporable solvent includes at least one of the following: ethanol, butyl acetate, xylene, and Dipropylene glycol dimethyl ether;

the applying of the first evaporable solvent includes:

soaking the first evaporable solvent with a paper or a cloth; and wiping the soaked paper or cloth until the first polyurethane coating layer is in a state of loss of gloss;

the first polyurethane coating layer includes amino polyurethane (polyurea) or hydroxy polyurethane; and the second polyurethane coating layer includes amino polyurethane (polyurea) or hydroxy polyurethane.

Preferably, at least one of the following apply:

the second evaporable solvent includes at least one of the following: ethanol, butyl acetate, xylene, and Dipropylene glycol dimethyl ether;

the applying of the second evaporable solvent includes:

soaking the second evaporable solvent with a paper or a cloth; and wiping the soaked paper or cloth until the second polyurethane coating layer is in a state of loss of gloss; and the third polyurethane coating layer includes amino polyurethane (polyurea) or hydroxy polyurethane.

Preferably, at least one of the following apply:

the third evaporable solvent includes at least one of the following: ethanol, butyl acetate, xylene, and Dipropylene glycol dimethyl ether;

the applying of the third evaporable solvent includes:

soaking the third evaporable solvent with a paper or a cloth; and wiping the soaked paper or cloth until the third polyurethane coating layer is in a state of loss of gloss; and the fourth polyurethane coating layer includes amino polyurethane (polyurea) or hydroxy polyurethane.

Preferably, the first evaporable solvent is Dipropylene glycol dimethyl ether.

Preferably, the second evaporable solvent is Dipropylene glycol dimethyl ether.

Preferably, the third evaporable solvent is Dipropylene glycol dimethyl ether.

Preferably, the first polyurethane coating layer has a thickness of 30-3000 microns.

Preferably, the second polyurethane coating layer has a thickness of 30-3000 microns.

Preferably, the third polyurethane coating layer has a thickness of 30-3000 microns.

Preferably, further comprising forming one or more polyurethane coating layer on the substrate before forming the first polyurethane coating layer on the substrate.

In another embodiment, a method for forming a protective coating on a substrate is provided, the method comprising:

providing a substrate;

forming a first polyurethane coating layer on the substrate;

applying a first evaporable solvent on the first polyurethane coating layer, wherein the first evaporable solvent is applied on the first polyurethane coating layer within a first time period (T21) after forming the first polyurethane coating layer; and forming a second polyurethane coating layer on the first polyurethane coating layer, wherein:

the second polyurethane coating layer is formed on the first polyurethane coating layer within a second time period (T22) after applying the first evaporable solvent;

the first evaporable solvent applied on the first polyurethane coating layer is partially evaporated before the second polyurethane coating layer is provided on the first polyurethane coating layer.

Preferably, further comprising:

applying a second evaporable solvent on the second polyurethane coating layer, wherein the second evaporable solvent is applied on the second polyurethane coating layer within a third time period (T23) after forming the second polyurethane coating layer; and forming a third polyurethane coating layer on the second polyurethane coating layer within a fourth time period (T24) after applying the second evaporable solvent, wherein the second evaporable solvent applied on the second polyurethane coating layer is partially evaporated before the third polyurethane coating layer is provided on the second polyurethane coating layer.

Preferably, further comprising:

applying a third evaporable solvent on the third polyurethane coating layer, wherein the third evaporable solvent is applied on the third polyurethane coating layer within a fifth time period (T25) after forming the third polyurethane coating layer; and forming a fourth polyurethane coating layer on the third polyurethane coating layer within a sixth time period (T26) after applying the third evaporable solvent, wherein the third evaporable solvent applied on the third polyurethane coating layer is partially evaporated before the fourth polyurethane coating layer is provided on the third polyurethane coating layer.

Preferably, the first time period (T21) does not exceed 60 minutes; and the second time period (T22) is between 0-300 minutes, more preferably 3-20 minutes.

Preferably, the third time period (T23) does not exceed 60 minutes; and the fourth time period (T24) is between 0-300 minutes, more preferably 3-20 minutes.

Preferably, the fifth time period (T25) does not exceed 60 minutes; and the sixth time period (T26) is between 0-300 minutes, more preferably 3-20 minutes.

In another embodiment, a wind power generation system is provided, the wind power generation system comprising:

a blade, the blade configured to rotate around a central axis;

a first polyurethane coating layer formed on the blade; and a second polyurethane coating layer formed on the first polyurethane coating layer, wherein:

the second polyurethane coating layer is formed on the first polyurethane coating layer within a second time period (T32) after a first evaporable solvent is applied on the first polyurethane coating layer, wherein the first evaporable solvent is applied on the first polyurethane coating layer within a first time period (T31) after forming the first polyurethane coating layer;

the first evaporable solvent applied on the first polyurethane coating layer is partially evaporated before the second polyurethane coating layer is provided on the first polyurethane coating layer.

Preferably, further comprising:

a third polyurethane coating layer formed on the second polyurethane coating layer, the third polyurethane coating layer formed within a fourth time period (T34) after a second evaporable solvent is applied on the second polyurethane coating layer, wherein the second evaporable solvent is applied on the second polyurethane coating layer within a third time period (T33) after forming the second polyurethane coating layer, wherein the second evaporable solvent applied on the second polyurethane coating layer is partially evaporated before the third polyurethane coating layer is provided on the second polyurethane coating layer.

Preferably, further comprising:

a fourth polyurethane coating layer formed on the third polyurethane coating layer, the fourth polyurethane coating layer formed within a sixth time period (T36) after a third evaporable solvent is applied on the third polyurethane coating layer, wherein the third evaporable solvent is applied on the third polyurethane coating layer within an fifth time period (T35) after forming the third polyurethane coating layer, wherein the third evaporable solvent applied on the third polyurethane coating layer is partially evaporated before the fourth polyurethane coating layer is provided on the third polyurethane coating layer.

Preferably, the first time period (T31) does not exceed 60 minutes; and the second time period (T32) is between 0-300 minutes, more preferably 3-20 minutes.

Preferably, the third time period (T33) does not exceed 60 minutes; and the fourth time period (T34) is between 0-300 minutes, more preferably 3-20 minutes.

Preferably, the fifth time period (T35) does not exceed 60 minutes; and the sixth time period (T36) is between 0-300 minutes, more preferably 3-20 minutes.

For amino polyurethane (polyurea), please see preferable monomer as below.

| Polyol | Isocyanate | Diamine chain extender |
|---|---|---|
| Polycaprolactone diol;<br>Polytetrahydrofuran ether glycol;<br>Polyethylene Adipate;<br>GlycolPolycarbonate diol;<br>Polybutadiene polyol;<br>castor oil;<br>Polyoxypropylene glycol;<br>Polyethylene glycol phthalate glycol;<br>Hydroxy Polyacrylate;<br>Polyaspartate;<br>N,N'-(Dicyclohexylmethyl-4,4'-diyl)-bis-aspartate tetraisooctyl ester | HDI (hexamethylene diisocyanate);<br>MDI (diphenylmethane diisocyanate);<br>HMDI (hydrogenated diphenylmethane diisocyanate);<br>TDI (toluene diisocyanate);<br>IPDI (isophorone diisocyanate);<br>XDI (xylylene diisocyanate);<br>TTI (triphenylmethane triisocyanate);<br>PPDI (p-phenylene diisocyanate) | MOCA 3,3'-Dichloro-4,4'-Diaminodiphenylmethane;<br>3,5-Diaminochlorobenzoic acid isobutyl ester;<br>Diethyltoluenediamine;<br>Dimethylthiotoluenediamine;<br>4,4'-methylenebis(3-chloro-2,6-diethylaniline);<br>P-phenylenediamine;<br>M-phenylenediamine;<br>Diaminodiphenyl ether |

For hydroxy polyurethane, please see preferable monomer as below.

| Polyol | Isocyanate | Polyol chain extender |
|---|---|---|
| Polycaprolactone diol;<br>Polytetrahydrofuran ether glycol;<br>Polyethylene Adipate Glycol;<br>Polycarbonate diol;<br>Polybutadiene polyol;<br>castor oil;<br>Polyoxypropylene glycol;<br>Polyethylene glycol phthalate glycol;<br>Hydroxy Polyacrylate;<br>Polyaspartate;<br>N,N'-(Dicyclohexylmethyl-4,4'-diyl)-bis-aspartate tetraisooctyl ester | HDI (hexamethylene diisocyanate);<br>MDI (diphenylmethane diisocyanate);<br>HMDI (hydrogenated diphenylmethane diisocyanate);<br>TDI (toluene diisocyanate);<br>IPDI (isophorone diisocyanate);<br>XDI (xylylene diisocyanate);<br>TTI (triphenylmethane triisocyanate);<br>PPDI (p-phenylene diisocyanate) | 1,4-butanediol;<br>Ethylene glycol;<br>Propylene Glycol;<br>Diethylene glycol;<br>1,4-Cyclohexanol;<br>Neopentyl glycol;<br>Hydroquinone (β-hydroxyethyl) ether (HQEE);<br>Resorcinol bis(β-hydroxyethyl) ether (HER);<br>Bisphenol A glycerol a-allyl ether;<br>Trimethylolpropane monoallyl ether;<br>Dihydroxyethyl terephthalate (BHET); |

-continued

| Polyol | Isocyanate | Polyol chain extender |
|---|---|---|
| | | Dimethylolpropane (TMP); glycerin; Ethanolamine; Diethanolamine; Triethanolamine; Triisopropanolamine; N,N-bis(2-hydroxypropyl)aniline |

BRIEF DESCRIPTION OF THE SEVERAL VIEWS OF THE DRAWINGS

For a more complete understanding of the present disclosure, example embodiments, and their advantages, reference is now made to the following description taken in conjunction with the accompanying figures, in which like reference numbers indicate like features, and.

Although similar reference numbers may be used to refer to similar elements in the figures for convenience, it can be appreciated that each of the various example embodiments may be considered to be distinct variations.

Figure 1:
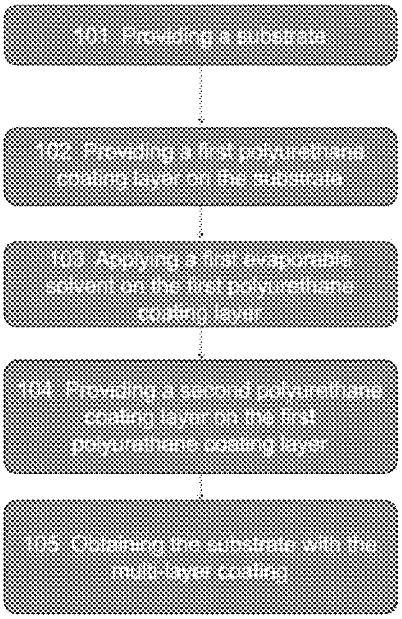
FIG. 1 illustrates an example embodiment of a method for producing multi-layer protective coating.

Example embodiments will now be described with reference to the accompanying figures, which form a part of the present disclosure and which illustrate example embodiments which may be practiced. As used in the present disclosure and the appended claims, the terms "embodiment," "example embodiment," "exemplary embodiment," and "present embodiment" do not necessarily refer to a single embodiment, although they may, and various example embodiments may be readily combined and/or interchanged without departing from the scope or spirit of example embodiments. Furthermore, the terminology as used in the present disclosure and the appended claims is for the purpose of describing example embodiments only and is not intended to be limitations. In this respect, as used in the present disclosure and the appended claims, the term "in" may include "in" and "on," and the terms "a," "an," and "the" may include singular and plural references. Furthermore, as used in the present disclosure and the appended claims, the term "by" may also mean "from," depending on the context. Furthermore, as used in the present disclosure and the appended claims, the term "if" may also mean "when" or "upon," depending on the context. Furthermore, as used in the present disclosure and appended claims, the words "and/or" may refer to and encompass any or all possible combinations of one or more of the associated listed items.

DESCRIPTION OF SPECIFIC EMBODIMENTS OF THE INVENTION

When producing protective multi-layer coating on a wind power blade using conventional methods, an adhesion strength between layers is often insufficient when the wind power blade is exposed in real natural environment for wind power generation. Single-layer coating often has insufficient thickness. Other conventional methods either requires alteration to the composition of coating materials or requires complex and high operation standards. Conventional protective coatings often have undesired inter-layer bonding and low stripping resistance, and thus require frequent maintenance, especially when exposed in natural environment.

Present example embodiments relate generally to and/or include systems, subsystems, devices, methods, and processes for addressing conventional problems, including those described above and in the present disclosure, and more specifically, example embodiments relate to systems, subsystems, devices, methods, and processes for manufacturing a wind power blade, and more specifically, improving stripping resistance between multi-layered protective coating of a wind power blade, including, but not limited to, improving stripping resistance under sand and/or rain erosion, improving interlayer adhesion and bonding, processing and/or treating surface, altering over-coating window of multi-layered product, protecting the surface of a wind power blade, protecting the leading edge of wind power blade, and/or improving multi-layer polyurethane protective coating.

As described in the present disclosure, example embodiments offer various technical advantages and/or improvements over conventional methods, including but not limited to, providing a simplified, time-effective and environment friendly manufacturing method without altering the preparation of the polyurethane coating material. Example embodiments of the present disclosure and achieve sufficient thickness and meet natural and critical operation environment.

It is to be understood that, while example embodiments are mostly described in the present disclosure as pertaining to polyurethane coating, the principles described in the present disclosure may also be applied outside of the context of polyurethane coating, such as polymeric coating comprising epoxy coating, acrylic coating etc., without departing from the teachings of the present disclosure.

It is to be understood that, while example embodiments are mostly described in the present disclosure as pertaining to improve stripping resistance and/or adhesion between layers, the present disclosure is not limited to the designated purpose.

It is also to be understood that, while example embodiments are mostly described in the present disclosure as pertaining to protective coating on a wind power blade, particularly the leading edge of a wind power blade, the principles described in the present disclosure may also be applied outside of the context of wind power blade, such as protective coating for airplanes, helicopters, fan blades, drone blades, hydroturbine, steam turbine etc., without departing from the teachings of the present disclosure. It is recognized that the present disclosure is universally applicable to general protective coating, and methods of manufacturing thereof.

It is also to be understood in the present disclosure that one or more elements and/or aspects of example embodiments may include and/or implement, in part or in whole, solely and/or in cooperation with other elements, using, for example, hybrid multi-layered products.

Unless otherwise defined, all technical terms used in the present disclosure have the same meaning as commonly understood by those skilled in the art. The terminology used herein is only for the purpose of describing specific example embodiments, and is not intended to limit the scope of protection. Unless otherwise specified, the various raw materials, reagents, instruments and equipment used in the present disclosure can be purchased from the market and/or can be prepared by existing methods.

The terms "over-coating" or "re-coating" is understood by those skilled in the art as applying an additional layer on a previously coated layer. The term "over-coating window" is understood by those skilled in the art as the suitable time window for over-coating or re-coating of the additional layer. The terms "touch dry", "shiatsu dry", "finger dry", or "surface dry" is understood by those skilled in the art as a condition where the surface of a polymeric coating layer is dry to touch without sticking to fingers, and refers to the initial drying of the surface after a certain period of time after the coating layer is applied to a substrate during painting process but yet to completely dry.

Example embodiments will now be described below with reference to the accompanying figures, which form a part of the present disclosure.

Embodiment 1

FIG. 1 illustrates an example embodiment of a method according to the present disclosure. These and other elements of the system 100 will now be described with reference to the accompanying figures.

As illustrated in FIG. 1, the method 100 includes

Step one 101: providing a substrate;

Step two 102: forming a first polyurethane coating layer on the substrate, wherein the first polyurethane coating layer reaches touch dry in a first time period (T1);

Step three 103: applying a first evaporable solvent on the first polyurethane coating layer, wherein the first evaporable solvent is applied on the first polyurethane coating layer within a second time period (T2) after the first polyurethane coating layer reaches touch dry;

Step four 104: forming a second polyurethane coating layer on the first polyurethane coating layer within a third time period (T3) after applying the first evaporable solvent, wherein the first evaporable solvent applied on the first polyurethane coating layer is partially evaporated before forming the second polyurethane coating layer on the first polyurethane coating layer, wherein the second polyurethane coating layer reaches touch dry in a fourth time period (T4); and Step five 105: obtaining the substrate with the multi-layer coating, wherein the multi-layer coating includes the first polyurethane coating layer and the second polyurethane coating layer.

Embodiment 2

Figure 2A:
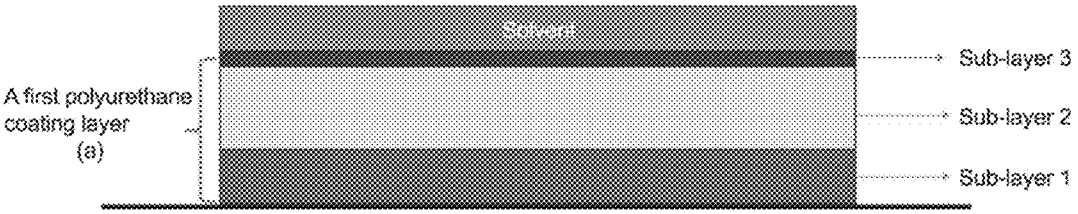
FIG. 2 illustrates the reaction mechanism of method 100.
Figure 2B:
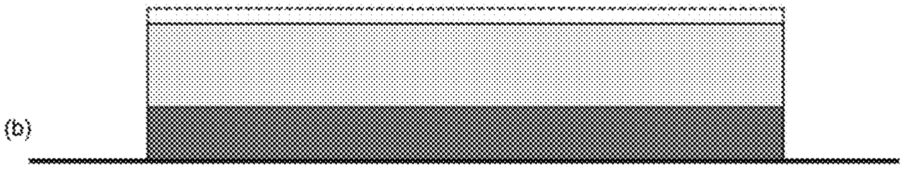
Figure 2C:
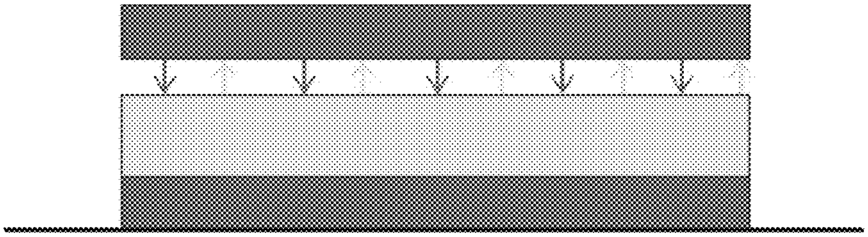
Figure 3I:
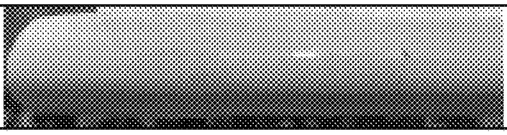
FIG. 3 illustrates comparison adopting dipropylene glycol dimethyl ether as solvent with no solvent.
Figure 3I:
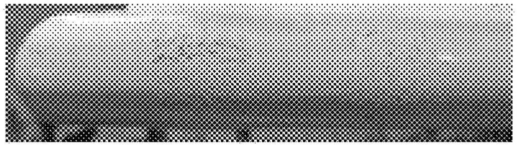
Figure 3I:
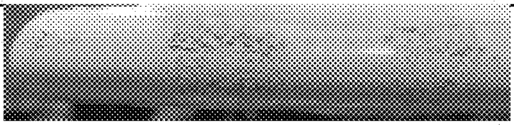
Figure 3I:
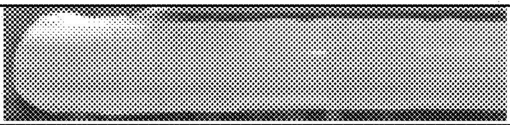
Figure 3I:
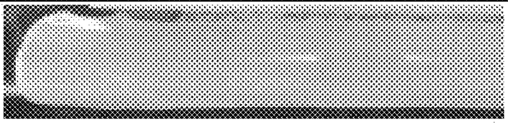
Figure 3I:
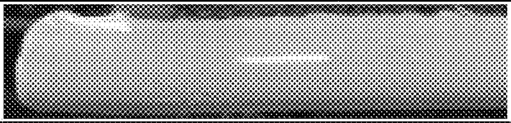
Figure 3I:
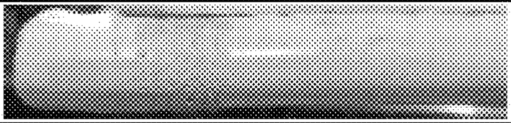
Figure 3I:
Figure 3I:
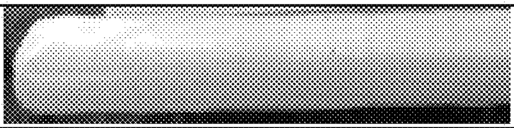
Figure 3I:
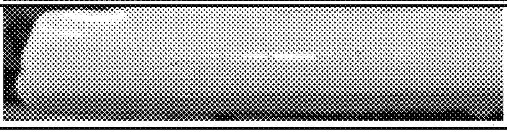
Figure 3I:
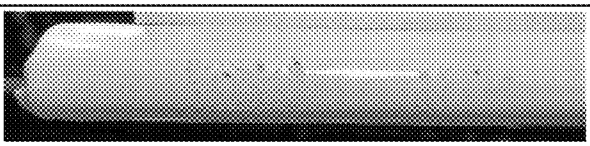
Figure 3I:
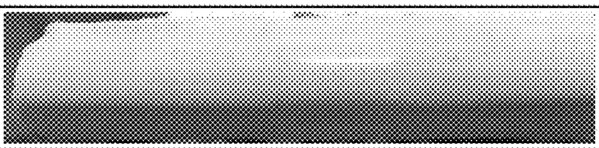
Figure 3I:
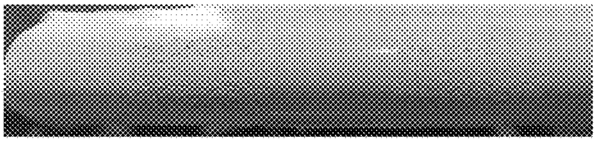
Figure 3I:
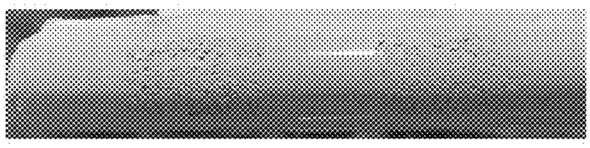
Figure 3I:
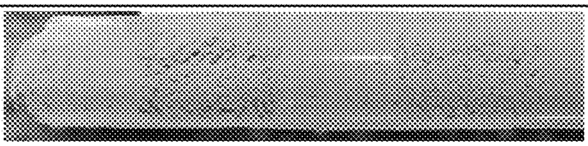
Figure 3I:
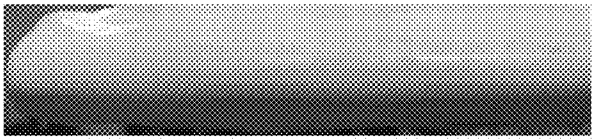
Figure 3I:
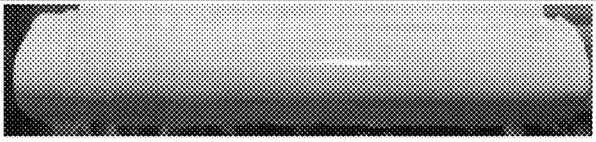
Figure 3I:
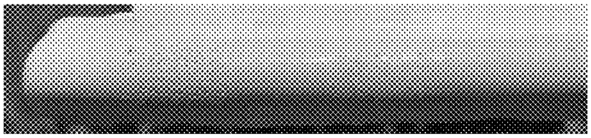
Figure 3I:
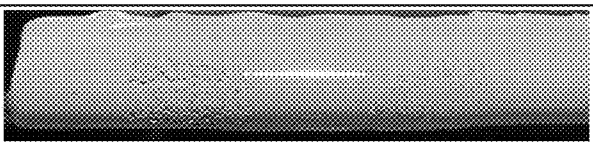
Figure 3I:
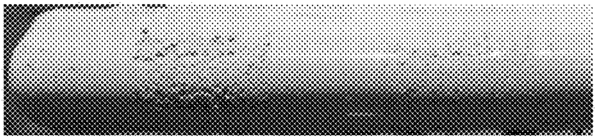
Figure 3I:
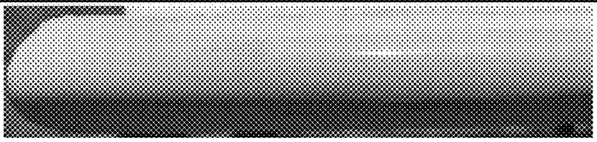

FIG. 2 illustrates the reaction mechanism of method 100.

As illustrated in FIG. 2(*a*), after a first curing time, a first polyurethane coating layer has solidified into three layers. For the bottom layer (Sub-layer 1), it is still in liquid state and only a small amount of cross-linking reaction occurs; for the middle layer (Sub-layer 2), partial cross-linking reaction occurs; for the top layer (Sub-layer 3), most of the cross-linking reaction has been completed. Then the solvent is applied onto the first polyurethane coating layer. As illustrated in FIG. 2(*b*), the solvent will dissolve the sub-layer 3.

As illustrated in FIG. 2(*c*), the second polyurethane coating layer will be provided on the first polyurethane coating layer.

Embodiment 3

FIG. 3 illustrates comparison adopting dipropylene glycol dimethyl ether as solvent with no solvent This invention applies amino-polyurethane (MEGA 3650 PF) to a substrate with a length of 22-23 cm and a width of around 5 cm. The thickness of the coating is around 300 micrometer. The coating reaches touch dry in a first time period (T1). Within a second time period (T2) after the first polyurethane coating layer reaches touch dry, soak the solvent, i.e. dipropylene glycol dimethyl ether, with a paper or a cloth; and wipe the soaked pater or cloth for a time period of 5-10 seconds till the first polyurethane coating layer is in a state of loos of gloss. Then provide a second polyurethane coating layer on the first polyurethane coating layer within a third time period (T3) of 10-20 min after applying the first evaporable solvent.

Then subject the multi-layer coating to a rain erosion test (ASTM G73-10, raindrop size of 1-2 mm, tip velocity of 207 m/s and rain intensity of 70-90 ml/h) for a time period T (rain).

The test condition are as below. Please refer to FIG. 3 for test results.

| Examples | T1 + T2 (min) | T3 (min) | T(rain) |
|---|---|---|---|
| 3-1 | 30 | 10 | 0 |
| 3-2 | 30 | 10 | 60 |
| 3-3 | 30 | 10 | 120 |
| 3-4 | 40 | 10 | 0 |
| 3-5 | 40 | 10 | 60 |
| 3-6 | 40 | 10 | 120 |
| 3-7 | 40 | 10 | 180 |
| 3-8 | 40 | 15 | 0 |
| 3-9 | 40 | 15 | 60 |
| 3-10 | 40 | 15 | 120 |
| 3-11 | 40 | 15 | 180 |
| 3-12 | 40 | 20 | 0 |
| 3-13 | 40 | 20 | 60 |
| 3-14 | 40 | 20 | 120 |
| 3-15 | 40 | 20 | 180 |
| 3-16 | 60 | 10 | 0 |
| 3-17 | 60 | 10 | 60 |
| 3-18 | 60 | 10 | 120 |
| 3-19 | 60 | 10 | 180 |
| 3-20 | 60 | 20 | 0 |
| 3-21 | 60 | 20 | 60 |
| 3-22 | 60 | 20 | 120 |
| 3-23 | 60 | 20 | 180 |
| 3-24 (Comparative Example) | 30 | / (No solvent) | 0 |
| 3-25 (Comparative Example) | 30 | / (No solvent) | 60 |
| 3-26 (Comparative Example) | 30 | / (No solvent) | 120 |
| 3-27 (Comparative Example) | 45 | / (No solvent) | 0 |
| 3-28 (Comparative Example) | 45 | / (No solvent) | 60 |
| 3-29 (Comparative Example) | 90 | 10 | 0 |
| 3-30 (Comparative Example) | 90 | 10 | 60 |

Embodiment 4

Figure 4I:
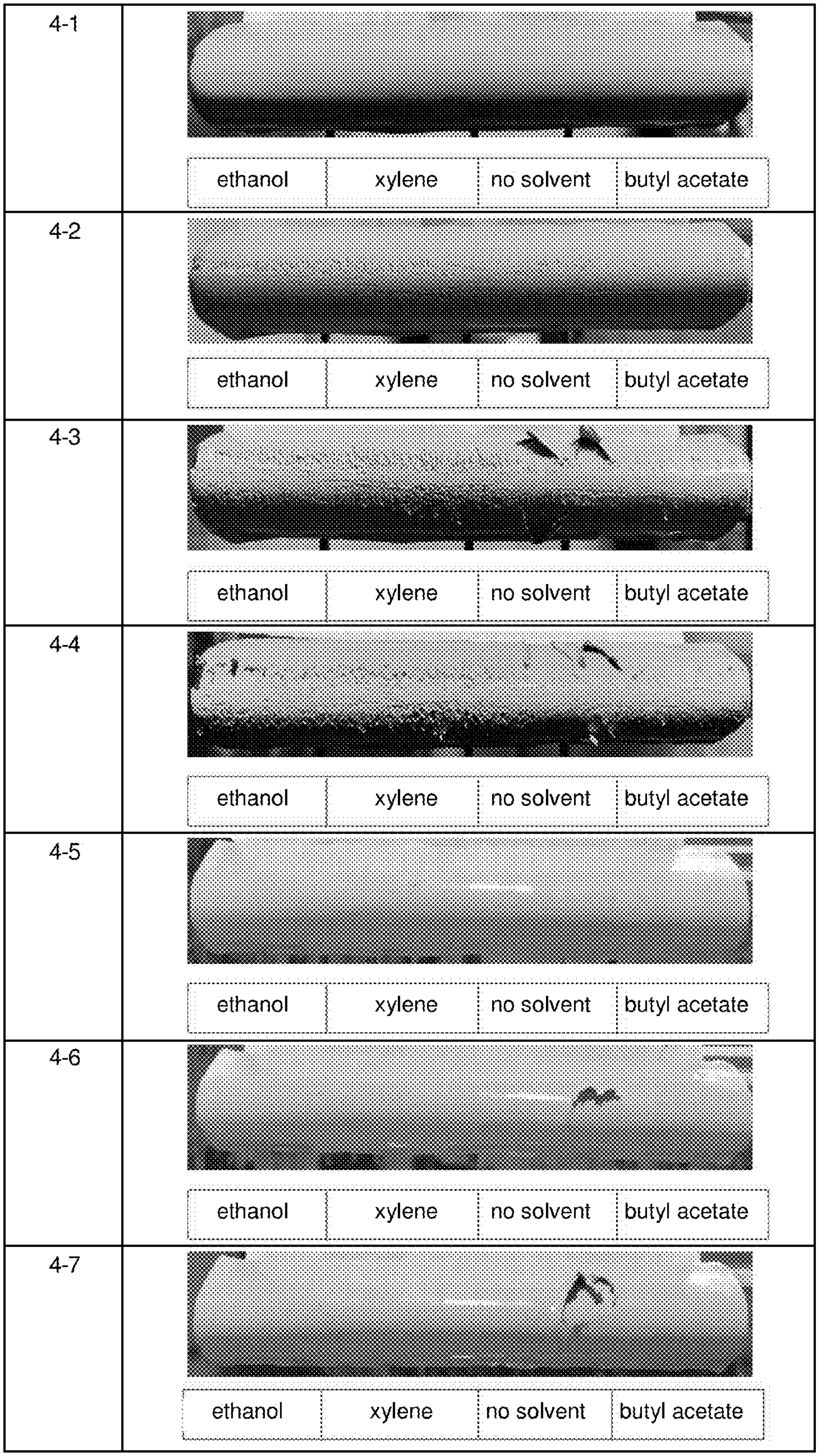
FIG. 4 illustrates comparison of different solvents, i.e. ethanol, xylene, and butyl acetate, with no solvent.
Figure 4I:
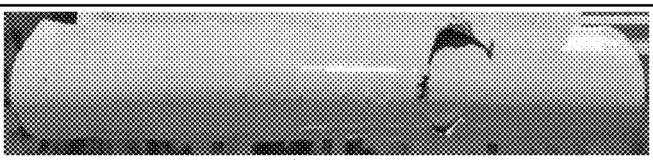
Figure 4I:

FIG. 4 illustrates comparison of different solvents, i.e. ethanol, xylene, and butyl acetate, with no solvent.

The test conditions are the same as FIG. 3, but with different solvents.

| Examples | T1 + T2 (min) | T3 (min) | T(rain) |
|---|---|---|---|
| 4-1 | 45 | 10 | 0 |
| 4-2 | 45 | 10 | 60 |
| 4-3 | 45 | 10 | 120 |
| 4-4 | 45 | 10 | 180 |
| 4-5 | 40 | 10 | 0 |
| 4-6 | 40 | 10 | 10 |
| 4-7 | 40 | 10 | 30 |
| 4-8 | 40 | 10 | 60 |
| 4-9 | 40 | 10 | 120 |

Embodiment 5

The gloss is tested according to Standard GB/T 9754.

| Test Conditions | No solvent | Dipropylene glycol dimethyl ether | Ethanol | Xylene | Butyl acetate |
|---|---|---|---|---|---|
| The first coating is solidified for 40 min | 88-91 | / | / | / | / |
| The first coating is solidified for 40 min; solvent applied and evaporated for 1 min | / | 48-50 | 6-8 | 32-34 | 24-27 |
| The first coating is solidified for 45 min; solvent applied and evaporated for 5 min | / | 48-50 | 6-8 | 32-34 | 24-27 |
| The first coating is solidified for 45 min; solvent applied and evaporated for 10 min | / | 48-50 | 6-8 | 32-34 | 24-27 |
| The first coating is solidified for 45 min; solvent applied and evaporated for 20 min | / | 48-50 | 6-8 | 32-34 | 24-27 |
| The first coating is solidified for 45 min; solvent applied and evaporated for 30 min | / | 48-50 | 6-8 | 32-34 | 24-27 |
| The first coating is solidified for over 12 h; solvent applied | 88-91 | 88-91 | 88-91 | 88-91 | 88-91 |

Various terms used herein have special meanings within the present technical field. Whether a particular term should be construed as such a "term of art" depends on the context in which that term is used. Terms are to be construed in light of the context in which they are used in the present disclosure and as one of ordinary skill in the art would understand those terms in the disclosed context. Definitions provided herein are not exclusive of other meanings that might be imparted to those terms based on the disclosed context.

Words of comparison, measurement, and timing such as "at the time", "equivalent", "during", "complete", and the like should be understood to mean "substantially at the time", "substantially equivalent", "substantially during", "substantially complete", etc., where "substantially" means that such comparisons, measurements, and timings are practicable to accomplish the implicitly or expressly stated desired result.

Additionally, the section headings and topic headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method for forming a protective coating on a substrate, the method comprising:

providing a substrate;

forming a first polyurethane coating layer on the substrate, the first polyurethane coating layer formed on the substrate in such a way that the first polyurethane coating layer reaches a touch dry state within a first time period (T1) after the first polyurethane coating layer is provided on the substrate;

applying a treatment consisting of a first evaporable solvent on the first polyurethane coating layer, wherein the first evaporable solvent is applied on the first polyurethane coating layer within a second time period (T2) after the first polyurethane coating layer reaches the touch dry state that a top sub-layer of the first polyurethane coating layer has undergone substantially complete cross-linking while sub-layers beneath the top sub-layer have undergone only partial cross-linking; and forming a second polyurethane coating layer on the first polyurethane coating layer, wherein:

the second polyurethane coating layer is formed on the first polyurethane coating layer within a third time period (T3) after applying the first evaporable solvent;

the first evaporable solvent applied on the first polyurethane coating layer is partially evaporated before the second polyurethane coating layer is provided on the first polyurethane coating layer;

partial cross-linking reaction occurs in the sub-layers beneath the top sub-layer of the first polyurethane coating layer when the second polyurethane coating layer is provided on the first polyurethane coating layer; and the second polyurethane coating layer reaches the touch dry state within a fourth time period (T4) after the second polyurethane coating layer is provided on the first polyurethane coating layer.

2. The method of claim 1, further comprising:

applying a treatment consisting of a second evaporable solvent on the second polyurethane coating layer, wherein the second evaporable solvent is applied on the second polyurethane coating layer within a fifth time period (T5) after the second polyurethane coating layer reaches the touch dry state; and forming a third polyurethane coating layer on the second polyurethane coating layer within a sixth time period (T6) after applying the second evaporable solvent, wherein the second evaporable solvent applied on the second polyurethane coating layer is partially evaporated before the third polyurethane coating layer is provided on the second polyurethane coating layer; and the third polyurethane coating layer reaches the touch dry state within a seventh time period (T7) after the third polyurethane coating layer is provided on the second polyurethane coating layer.

3. The method of claim 2, wherein a summation of the fourth time period (T4) and the fifth time period (T5) does not exceed 60 minutes; and the sixth time period (T6) is between 0-300 minutes.

4. The method of claim 2, wherein a summation of the fourth time period (T4) and the fifth time period (T5) is between 30-60 minutes.

5. The method of claim 2, wherein at least one of the following apply:

the second evaporable solvent includes at least one of the following: ethanol, butyl acetate, xylene, and Dipropylene glycol dimethyl ether;

the applying of the second evaporable solvent includes:

soaking the second evaporable solvent with a paper or a cloth; and wiping the soaked paper or cloth until the second polyurethane coating layer is in a state of loss of gloss; and the third polyurethane coating layer includes amino polyurethane (polyurea) or hydroxy polyurethane.

6. The method of claim 2, wherein the second evaporable solvent is Dipropylene glycol dimethyl ether.

7. The method of claim 2, wherein the third polyurethane coating layer has a thickness of 30-3000 microns.

8. The method of claim 2, further comprising:

applying a treatment consisting of a third evaporable solvent on the third polyurethane coating layer, wherein the third evaporable solvent is applied on the third polyurethane coating layer within an eighth time period (T8) after the third polyurethane coating layer reaches the touch dry state; and forming a fourth polyurethane coating layer on the third polyurethane coating layer within a ninth time period (T9) after applying the third evaporable solvent, wherein the third evaporable solvent applied on the third polyurethane coating layer is partially evaporated before the fourth polyurethane coating layer is provided on the third polyurethane coating layer.

9. The method of claim 8, wherein a summation of the seventh time period (T7) and the eighth time period (T8) does not exceed 60 minutes; and the ninth time period (T9) is between 0-300 minutes.

10. The method of claim 8, wherein a summation of the seventh time period (T7) and the eighth time period (T8) is between 30-60 minutes.

11. The method of claim 3, wherein at least one of the following apply:

T2≈(0.3−10)*T1;

T5≈(0.3−10)*T4; and

T8≈(0.3−10)*T7.

12. The method of claim 8, wherein at least one of the following apply:

the third evaporable solvent includes at least one of the following: ethanol, butyl acetate, xylene, and Dipropylene glycol dimethyl ether;

the applying of the third evaporable solvent includes:

soaking the third evaporable solvent with a paper or a cloth; and wiping the soaked paper or cloth until the third polyurethane coating layer is in a state of loss of gloss; and the fourth polyurethane coating layer includes amino polyurethane (polyurea) or hydroxy polyurethane.

13. The method of claim 8, wherein the third evaporable solvent is Dipropylene glycol dimethyl ether.

14. The method of claim 1, wherein a summation of the first time period (T1) and the second time period (T2) does not exceed 60 minutes; and the third time period (T3) is between 0-300 minutes.

15. The method of claim 1, wherein a summation of the first time period (T1) and the second time period (T2) is between 30-60 minutes.

16. The method of claim 1, wherein at least one of the following apply:

the first evaporable solvent includes at least one of the following: ethanol, butyl acetate, xylene, and Dipropylene glycol dimethyl ether;

the applying of the first evaporable solvent includes:

soaking the first evaporable solvent with a paper or a cloth; and wiping the soaked paper or cloth until the first polyurethane coating layer is in a state of loss of gloss;

the first polyurethane coating layer includes amino polyurethane (polyurea) or hydroxy polyurethane; and the second polyurethane coating layer includes amino polyurethane (polyurea) or hydroxy polyurethane.

17. The method of claim 1, wherein the first evaporable solvent is Dipropylene glycol dimethyl ether.

18. The method of claim 1, wherein the first polyurethane coating layer has a thickness of 30-3000 microns.

19. The method of claim 1, wherein the second polyurethane coating layer has a thickness of 30-3000 microns.

20. The method of claim 1, further comprising forming one or more polyurethane coating layer on the substrate before forming the first polyurethane coating layer on the substrate.

21. A method for forming a protective coating on a substrate, the method comprising:

providing a substrate;

forming a first polyurethane coating layer on the substrate;

applying a treatment consisting of a first evaporable solvent on the first polyurethane coating layer, wherein the first evaporable solvent is applied on the first polyurethane coating layer within a first time period (T21) after forming the first polyurethane coating layer, wherein a top sub-layer of the first polyurethane coating layer has undergone substantially complete cross-linking while sub-layers beneath the top sub-layer have undergone only partial cross-linking; and forming a second polyurethane coating layer on the first polyurethane coating layer, wherein:

the second polyurethane coating layer is formed on the first polyurethane coating layer within a second time period (T22) after applying the first evaporable solvent;

the first evaporable solvent applied on the first polyurethane coating layer is partially evaporated before the second polyurethane coating layer is provided on the first polyurethane coating layer, and partial cross-linking reaction occurs in the sub-layers beneath the top sub-layer of the first polyurethane coating layer when the second polyurethane coating layer is provided on the first polyurethane coating layer.

22. The method of claim 21, further comprising:

applying a treatment consisting of a second evaporable solvent on the second polyurethane coating layer, wherein the second evaporable solvent is applied on the second polyurethane coating layer within a third time period (T23) after forming the second polyurethane coating layer; and forming a third polyurethane coating layer on the second polyurethane coating layer within a fourth time period (T24) after applying the second evaporable solvent, wherein the second evaporable solvent applied on the second polyurethane coating layer is partially evaporated before the third polyurethane coating layer is provided on the second polyurethane coating layer.

23. The method of claim 22, the third time period (T23) does not exceed 60 minutes; and the fourth time period (T24) is between 0-300 minutes.

24. The method of claim 22, further comprising:

applying a treatment consisting of a third evaporable solvent on the third polyurethane coating layer, wherein the third evaporable solvent is applied on the third polyurethane coating layer within a fifth time period (T25) after forming the third polyurethane coating layer; and forming a fourth polyurethane coating layer on the third polyurethane coating layer within a sixth time period (T26) after applying the third evaporable solvent, wherein the third evaporable solvent applied on the third polyurethane coating layer is partially evaporated before the fourth polyurethane coating layer is provided on the third polyurethane coating layer.

25. The method of claim 24, the fifth time period (T25) does not exceed 60 minutes; and the sixth time period (T26) is between 0-300 minutes.

26. The method of claim 21, the first time period (T21) does not exceed 60 minutes; and the second time period (T22) is between 0-300 minutes.

* * * * *